Aug. 17, 1937.  W. F. LYNCH ET AL  2,090,422
PISTON RING FITTING SAW
Filed April 16, 1936
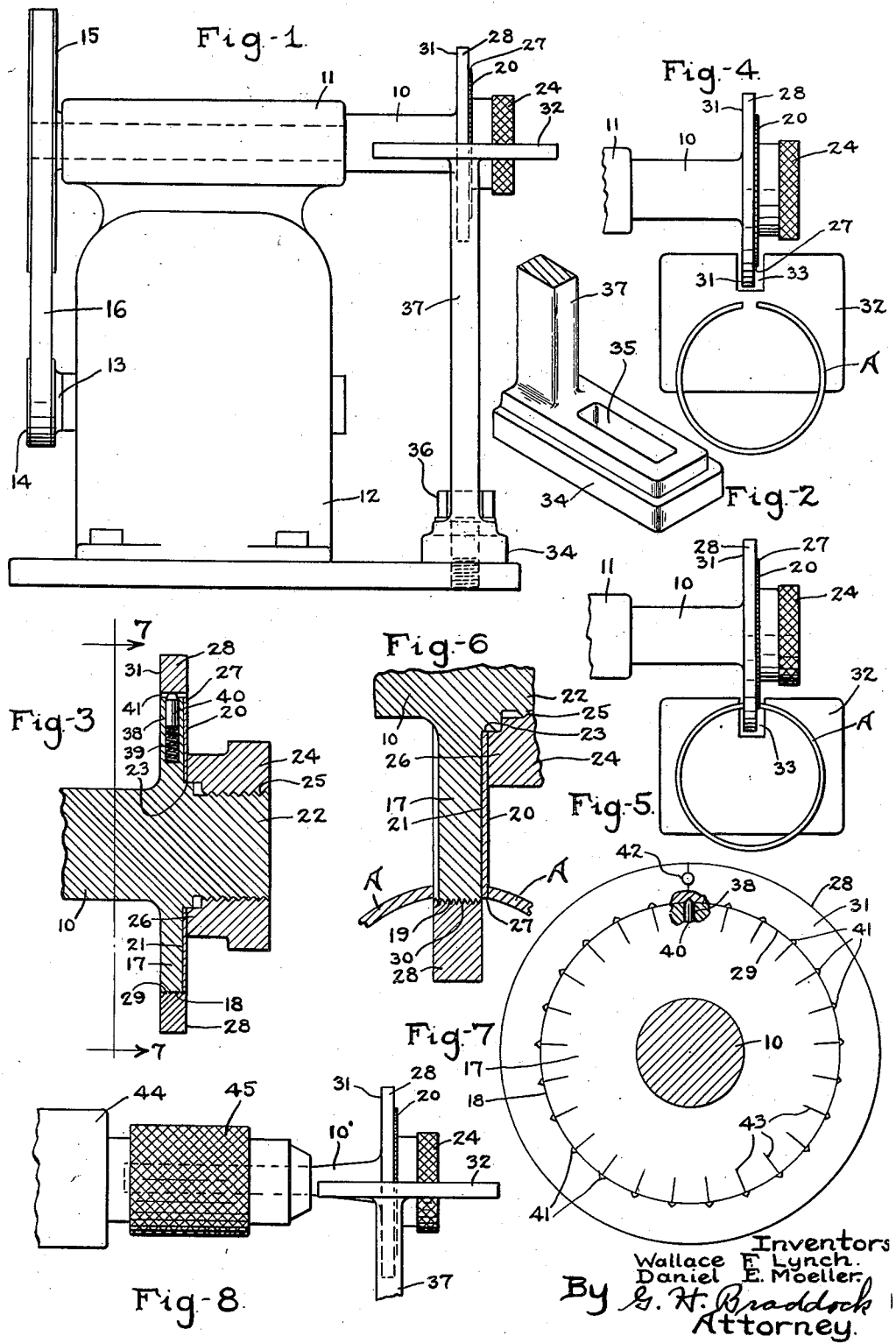
Inventors
Wallace F. Lynch.
Daniel E. Moeller.
By G. H. Braddock
Attorney.

Patented Aug. 17, 1937

2,090,422

UNITED STATES PATENT OFFICE 2,090,422

PISTON RING FITTING SAW

Wallace F. Lynch and Daniel E. Moeller, Memphis, Tenn., assignors to Storm Manufacturing Company, Inc., Minneapolis, Minn., a corporation of Minnesota Application April 16, 1936, Serial No. 74,666

21 Claims. (Cl. 29—69)

This invention has relation to a piston ring fitting saw.

A piston ring includes a transverse slot or clearance between its adjacent, free ends. In some particular instance said slot or clearance may be of nature provided by a so-called butt-joint piston ring, or a so-called step-cut piston ring, or a so-called miter-cut piston ring, all well known to the present art.

In fitting a piston ring to a piston it is essential that a slot or clearance of predetermined and proper dimension or width be provided between the free ends of the ring.

In its broader aspects, the present invention provides a device which can be employed to produce slots or clearances of predetermined dimensions or widths in or through a variety of members or articles of different types, but the device as illustrated and as hereinafter described has been designed to be more especially useful as an instrumentality for producing slots or clearances of proper and predetermined dimensions or widths between the adjacent, free ends of piston rings with the purpose in view of rendering the piston rings capable of being fitted to or upon pistons in altogether satisfactory manner.

An object of the invention is to provide a device of the present character wherein will be incorporated various novel and improved features and characteristics of construction.

A further object is to provide a device of the present character which will include a gaging element, a saw for cutting a member or article, such as a piston ring, to provide a slot or clearance in the member or article, and novel and improved means for accurately adjusting the gaging element and saw relatively to each other to render the device capable of producing a slot or clearance of predetermined and proper dimension or width in said member, article or piston ring.

A further object is to provide a device for producing slots or clearances between the free ends of piston rings, which device will include a gaging element adapted to be engagingly slid over or along one of the free ends of a piston ring, a circular saw adjacent said gaging element for cutting off an end portion of the piston ring opposite the end engaged by said gaging element while the gaging element is being slid over or along said end which it engages, and novel and improved means for accurately adjusting the gaging element and circular saw away from and toward each other to thus make the device capable of producing a slot or clearance of predetermined and proper dimension or width in said piston ring adapted to the purpose of rendering the piston ring capable of being suitably and satisfactorily fitted to or upon a piston.

And a further object is to provide a device of the character as set forth, including a gaging element and a circular saw, which can be constituted as an independent and separate entity or tool for removable association or assembly with driving mechanism for the entity or tool, as, for example, by employment of an ordinary chuck.

With the above objects in view, as well as others which will appear as the specification proceeds, the invention comprises the construction, arrangement and combination of parts as now to be fully described and as hereinafter to be specifically claimed, it being understood that the disclosure herein is merely illustrative and intended in no way in a limiting sense, changes in details of construction and arrangement of parts being permissible so long as within the spirit of the invention and the scope of the claims which follow.

In the accompanying drawing forming a part of this specification,

Fig. 1 is an elevational view of a device made according to the invention and applied to use as a permanent part of a machine for operating or driving the device;

Fig. 2 is a fragmentary perspective view of the base and standard of a piston ring supporting table of the machine disclosed in Fig. 1;

Fig. 3 is an enlarged, central sectional view of the device of Fig. 1, a portion of the driven shaft of said device being broken away;

Fig. 4 is a top plan view of the device and supporting table of Fig. 1, disclosing a piston ring resting upon said table in position to be advanced to the device to be operated upon;

Fig. 5 is a view similar to the disclosure of Fig. 4, but showing the piston ring as when the operation performed by the device is completed;

Fig. 6 is a detail sectional view disclosing the device and piston ring in the same relative positions as in Fig. 5, the cut through the piston ring being completed;

Fig. 7 is a sectional view, taken as on line 7—7 in Fig. 3; and

Fig. 8 is a fragmentary elevational view of a device made according to the invention, but constituted as an independent or separate entity or tool removably set up in an operating or driving mechanism or machine for the entity by employment of a chuck.

With respect to Figs. 1 to 7 of the drawing, 10 denotes a driven shaft of the novel and improved device or piston ring fitting saw. As disclosed, the driven shaft 10 is horizontally disposed and is mounted in a bearing 11 of a machine for operating or driving the device. The bearing 11 is supported by the frame 12 of said machine, and said frame conveniently houses an electric motor the shaft of which is designated 13. Said motor shaft 13 fixedly carries a small pulley 14, and a larger pulley 15 is fixed upon the driven shaft 10 of the device. A belt 16 rides over the pulleys 14 and 15 and constitutes a driving connection between the motor shaft 13 and the driven shaft 10. Clearly, said shaft 10 can be driven in any other convenient and suitable manner.

A vertically disposed annular or circular disc member 17 is fixedly carried by the driven shaft 10. As disclosed, said disc member 17 is integral with said driven shaft. It could, however, be a separate member secured in fixed relation to the driven shaft. Or, stated differently, the annular or circular disc member 17 is fixed upon the driven shaft 10 and rotates with said shaft as a unit. Said annular or circular disc member 17 is perpendicular to the shaft 10, and includes an outer, circumferential surface 18 which is concentric with said shaft 10. Said outer, circumferential surface 18 is threaded, as represented at 19, and the thread or threads 19 extend circumferentially of the annular or circular disc member 17, as will be clear from Figs. 3 and 6.

A circular saw 20 is also fixed upon the driven shaft 10 to rotate with said shaft and with the annular or circular disc member 17 as a unit. Said circular saw 20 is as disclosed situated up against the vertical surface 21 of the annular or circular disc member 17 at the side of said disc member opposite the driven shaft 10. As disclosed, a hub or extension 22, in alinement with the driven shaft 10 and arranged centrally of the disc member 17, is disposed at the side of said disc member 17 opposite said driven shaft 10 to receive the circular saw 20. A central opening 23 in said circular saw is arranged upon said hub or extension 22, and a nut 24 upon the externally threaded surface 25 of the hub or extension has its inner end 26 turned into engagement with a surface of the circular saw surrounding the hub or extension 22 in adjacent relation to said hub or extension to clamp said circular saw against the annular or circular disc member 17. As disclosed, the periphery 27 of the circular saw 20 is in substantially the same circumference as is the external surface 18 of the annular or circular disc member 17. Said circular saw can of course be fixed upon the driven shaft 10, in contiguous relation with, or in proximity to, the adjacent vertical surface 21 of the disc member 17 in some other convenient manner.

A gaging member 28 consists of an annular disc member including an inner, circumferential surface 29 which is threaded, as indicated at 30, and the thread or threads 30 extend circumferentially of the gaging element or annular disc member 28.

The thread or threads 19 upon the outer, circumferential surface 18 and the thread or threads 30 upon the inner, circumferential surface 29 adjustably engage each other, as will be clear from the drawing, and relative rotation of the gaging element or annular disc member 28 and the annular or circular disc member 17 causes said gaging element or annular disc member 28 to be moved away from or toward the circular saw 20, depending upon the direction of the relative rotation of said gaging element and disc member.

The gaging element 28 remains perpendicular to the driven shaft 10 and in the vertical plane of the annular or circular disc member 17, or in a vertical plane alining with the plane of said annular or circular disc member. Relative rotation of the gaging element 28 and the disc member 17 causes relative axial movement of said gaging element and disc member, the relative axial movement carrying the gaging element away from or toward the circular saw 20, depending upon the direction of relative rotation of the gaging element and disc member, as will be understood. Said gaging element 28 includes a vertical gaging surface 31, at the side of the gaging element opposite the circular saw 20, arranged in a plane at right-angles to the driven shaft 10 and parallel to the vertical plane of said circular saw.

A table 32 is for supporting the work, member, article, or piston ring to be operated upon or cut. As disclosed, the table 32 includes a slot 33 at one side thereof clearing the gaging element 28, the circular saw 20, etc., of the device. A base for said table 32 is denoted 34, and said base includes an elongated slot 35 adapted to receive a bolt 36 for adjustably fastening the table upon the machine frame 12 suitably positioned relatively to the device. A standard 37 for the table connects the base 34 with the table proper.

The annular or circular disc member 17 includes a radial slot 38 which extends inwardly from the outer, circumferential surface 18 of said disc member 17. A coil spring 39 in the inner portion of the radial slot 38 urges a ratchet 40 in said slot at the outer side of the coil spring outwardly and into engagement with the inner, circumferential surface 29 of the gaging element 28, and said inner surface 29 includes equally spaced apart notches or indentations 41 for removably receiving the upper end of the ratchet 40. Said spring urged ratchet is adapted to selectively engage in the notches or indentations 41 to situate the gaging element 28 and disc member 17 in any position to which relatively adjusted, against the possibility of accidental displacement of the set adjustment of said gaging element and disc member while rotating as a unit during the operation of the device, and to permit relative rotary adjustment between the gaging element 28 and disc member when this is intentional. During relative rotation of the gaging element 28 and the disc member 17, the outer end of the ratchet 40 moves into and out of the notches or indentations 41 and over the inner surface 29 of said gaging element.

As disclosed in Fig. 7, the gaging surface 31 of the gaging element 28 includes an index mark or pointer 42 and the disc member 17 includes calibrations 43, one for each notch or indentation 41. By relative rotation of the gaging element and disc member so that the index mark or pointer 42 is moved from one of the calibrations 43 to the next, the gaging surface 31 and the circular saw 20 can be moved away from and toward each other an accurate, intended amount. For instance, if the advancement of the thread or threads 30 along the thread or threads 19 is predeterminedly made to be one inch for forty turns, and if the equally spaced apart notches or indentations 41 are twenty-five in number, relative rotation of the gaging element 28 and disc member 17 through a distance moving the ratchet 40 from a notch or indentation to the next adjacent notch or indentation will cause the gaging surface 31 and the circular saw 20 to move away from or toward each other one-thousandth of an inch, depending upon the direction of relative rotation of said gaging element and disc member.

The manner in which the device is employed to cut off an end portion of a so-called butt-joint piston ring A is very clearly disclosed in the drawing. First, the gaging element is adjusted with respect to the disc member 17, in the manner as hereinbefore set forth, to dispose the gaging surface 31 and the circular saw 20 at distance apart equal to the dimension or width of the slot or clearance which is to be between the adjacent, free ends of the piston ring to be cut. Next, the piston ring may be disposed upon the table 32, about as disclosed in Fig. 4, with its free or separated ends situated adjacent the gaging element 28. Then the piston ring may be slid over the table in direction toward the gaging element 28 and so that the left hand end of said piston ring engagingly slides over or along the gaging surface 31 of said gaging element. In the meantime, the device is rotating, downwardly at its table side, and the circular saw 20 cuts off the right hand end portion of said piston ring while said left hand end of the piston ring is sliding over or along the gaging surface 31. When the cutting off operation is complete, the relative positions of the device and the piston ring are as disclosed in Figs. 5 and 6. The slot or clearance is of course, after the cutting off operation, exactly the proper dimension or width predetermined to render the piston ring capable of being suitably and satisfactorily fitted to or upon a piston.

It is to be understood that the device of the invention can be employed to provide slots or clearances of predetermined and proper dimensions or width in so-called step-cut and miter-cut piston rings, either in the manner as described in connection with so-called butt-joint piston rings, or in some other manner which may be deemed feasible and is preferred. Also, slots or clearances can be provided in butt-joint piston rings in a way other than illustrated and described. The device can be employed in any chosen manner to produce slots or clearances of predetermined dimensions or widths in or through a variety of members or articles of different type.

In Fig. 8 there is disclosed a device made according to the invention, but constituted as an independent or separate entity or tool removably set up in an operating or driving mechanism 44 including a chuck 45. The device of Fig. 8 can in all respects be like the device as disclosed in Figs. 1 to 7, except that, preferably, the driven shaft 10' of said device of Fig. 8 will be of diameter to be removably received and fastened in the operating or driving member, such as 44, through the instrumentality of a chuck, such as 45, or other equivalent or suitable means.

What is claimed is:

1. A device for producing a clearance in a member, comprising a shaft adapted to be rotated, a circular saw upon and concentric with said shaft, said circular saw being rotatable with and lying in a plane perpendicular to said shaft, an element including a gaging surface for and in spaced relation to said circular saw rotatable with said shaft, said gaging surface lying in a plane perpendicular to said shaft and without the perimeter of said circular saw, and means for adjusting said circular saw and gaging surface relatively to each other axially of said shaft.

2. A device of the character described, comprising a shaft adapted to be rotated, a circular saw for cutting a member upon and concentric with said shaft, said circular saw being rotatable with and lying in a plane perpendicular to said shaft, an annular element upon and concentric with said shaft and without the perimeter of said circular saw, said annular element being rotatable with said shaft and including a gaging surface for and in spaced relation to said circular saw, and said gaging surface lying in a plane perpendicular to said shaft, and means for adjusting said circular saw and gaging surface relatively to each other axially of said shaft.

3. A device of the character described, comprising a shaft adapted to be rotated, a saw for cutting a member rotatable with said shaft, a gaging element for said saw rotatable with said shaft and without the perimeter of said saw, and means including interengaging threads for adjusting said saw and gaging element relatively to each other.

4. A device of the character described, comprising a shaft adapted to be rotated, a saw for cutting a member rotatable with said shaft, an element including a gaging surface for and in spaced relation to said saw rotatable with said shaft, said gaging surface lying in surrounding relation to said saw and means including interengaging threads for adjusting said saw and gaging surface relatively to each other.

5. A device for producing a clearance in a member, comprising a shaft adapted to be rotated, a circular saw rotatable with said shaft, an element including a gaging surface for and in spaced relation to said circular saw rotatable with said shaft, said gaging surface lying in surrounding relation to said saw and means including interengaging threads for adjusting said saw and gaging surface away from and toward each other.

6. A device for producing a clearance in a member, comprising a shaft adapted to be rotated, a circular saw upon and rotatable with said shaft and perpendicular thereto, an element including a gaging surface for and in spaced relation to said circular saw rotatable with said shaft, said gaging surface being without the perimeter of said circular saw and perpendicular to said shaft, and means including interengaging threads for adjusting said circular saw and gaging surface away from and toward each other.

7. A device for producing a clearance in a member, comprising a shaft adapted to be rotated, a circular saw upon and concentric with said shaft, said circular saw being rotatable with and lying in a plane perpendicular to said shaft, an element including a gaging surface for and in spaced relation to said circular saw rotatable with said shaft, said gaging surface lying in a plane perpendicular to said shaft and without the perimeter of said circular saw, and means including interengaging threads for adjusting said circular saw and gaging surface relatively to each other axially of said shaft.

8. A device of the character described, comprising a shaft adapted to be rotated, a circular saw, for cutting a member upon and concentric with said shaft, said circular saw being rotatable with and lying in a plane perpendicular to said shaft, an annular element upon and concentric with said shaft, said annular element being rotatable with said shaft and including a gaging surface for and in spaced relation to said circular saw, said gaging surface being in surrounding relation to said circular saw and said gaging surface lying in a plane perpendicular to said shaft, and means including interengaging threads for adjusting said circular saw and gaging surface relatively to each other axially of said shaft.

9. A device of the character described, comprising a shaft adapted to be rotated, a circular saw upon and concentric with said shaft, said circular saw being rotatable with and lying in a plane perpendicular to said shaft, a member adjacent said circular saw and rotatable with said shaft, said member including an outer, circumferential surface concentric with said shaft, an element including a gaging surface for and in spaced relation to said circular saw rotatable with said shaft, said gaging surface lying in a plane perpendicular to said shaft and being situated without the periphery of said circular saw, and said element including the gaging surface having an inner, circumferential surface concentric with said shaft and engaging said outer, circumferential surface of said member, and means including interengaging threads upon said inner and outer circumferential surfaces for adjusting said circular saw and gaging surface relatively to each other axially of said shaft.

10. A device of the character described, comprising a shaft adapted to be rotated, a circular saw upon and concentric with said shaft, said circular saw being rotatable with and lying in a plane perpendicular to said shaft, a member adjacent said circular saw and rotatable with said shaft, said member including an outer, circumferential surface concentric with said shaft, an annular element including a gaging surface for and in spaced relation to said circular saw rotatable with said shaft, said gaging surface lying in a plane perpendicular to said shaft and adjacent the periphery of said circular saw, and said annular element including the gaging surface having an inner, circumferential surface concentric with said shaft and engaging said outer, circumferential surface of said member, and means including interengaging, circumferentially extending threads upon said inner and outer circumferential surfaces for adjusting said circular saw and gaging surface relatively to each other axially of said shaft.

11. A device of the character described, comprising a shaft adapted to be rotated, a circular saw upon and concentric with said shaft, said circular saw being rotatable with and lying in a plane perpendicular to said shaft, a member adjacent said circular saw and rotatable with said shaft, said member including an outer, circumferential surface concentric with said shaft, an element including a gaging surface for and in spaced relation to said circular saw rotatable with said shaft, said gaging surface lying in a plane perpendicular to said shaft and said element including the gaging surface having an inner, circumferential surface concentric with said shaft and engaging said outer, circumferential surface of said member, means including interengaging, circumferentially extending threads upon said inner and outer circumferential surfaces for adjusting said circular saw and gaging surface relatively to each other axially of said shaft, by relative rotation of said annular member and element, and spring urged means for situating the annular member and element in any position to which adjusted against the possibility of accidental displacement from a set adjustment of said annular member and element.

12. A device of the character described, comprising a shaft adapted to be rotated, a circular saw upon and concentric with said shaft, said circular saw being rotatable with and lying in a plane perpendicular to said shaft, a member adjacent said circular saw and rotatable with said shaft, said member including an outer, circumferential surface concentric with said shaft, an annular element including a gaging surface for and in spaced relation to said circular saw rotatable with said shaft, said gaging surface lying in a plane perpendicular to said shaft, and said annular element including the gaging surface having an inner, circumferential surface concentric with said shaft and engaging said outer, circumferential surface of said member, means including interengaging, circumferentially extending threads upon said inner and outer circumferential surfaces for adjusting said circular saw and gaging surface relatively to each other axially of said shaft by relative rotation of said member and annular element, said member having a radial slot and said inner, circumferential surface of said annular element including equally spaced apart notches, and a spring urged ratchet in said radial slot for selectively engaging said notches to situate said member and annular element in set adjustment relation to each other.

13. A device for producing a clearance between the free ends of a piston ring, comprising an element including a gaging surface adapted to be slid over one of the free ends of of a piston ring, a circular saw in spaced relation to said gaging surface for cutting off an end portion of said piston ring opposite the end engaged by said gaging surface while the gaging surface is being slid over the end of the piston ring which it engages, a shaft adapted to be driven to cause said element with gaging surface and said circular saw to be rotated as a unit, said gaging surface and circular saw lying in planes perpendicular to said shaft, and means for relatively adjusting said gaging surface and said circular saw axially of said shaft, away from and toward each other, to thus render said device capable of producing a clearance of predetermined width in said piston ring.

14. A device of the character described, comprising a shaft adapted to be rotated, a disc member fixed to the shaft and including an outer, circumferential surface concentric with said shaft, a circular saw fixed to said shaft adjacent said outer, circumferential surface of the disc member, said circular saw lying in a plane perpendicular to said shaft and said outer, circumferential surface of the disc member including an annularly extending thread, and an annular element having a gaging surface opposite said circular saw lying in a plane perpendicular to said shaft, said annular element having an inner, circumferential surface including an annularly extending thread in adjustable engagement with said annularly extending thread upon said outer, circumferential surface of the disc member.

15. A device of the character described, comprising a shaft adapted to be rotated, a member fixed to said shaft and including an outer, circumferential surface concentric with said shaft, a circular saw fixed to said shaft and member adjacent said outer, circumferential surface of the member, said circular saw lying in a plane perpendicular to said shaft and said outer, circumferential surface of said member including an annularly extending thread, and an annular element having a gaging surface opposite said circular saw lying in a plane perpendicular to said shaft, said annular element having an inner circumferential surface including an annularly extending thread in adjustable engagement with said annularly extending thread upon said outer, circumferential surface of said member.

16. A device for producing a clearance between the free ends of a member, such as a piston ring, comprising an element including a gaging surface adapted to be slid over one of the free ends of said member, a circular saw in spaced relation to said gaging surface for cutting off an end portion of said member opposite the end engaged by said gaging surface while the gaging surface is being slid over the end of the member which it engages, a shaft adapted to be driven to cause said element with gaging surface and said circular saw to be rotated as a unit, and means for relatively adjusting said gaging surface and said circular saw upon said shaft.

17. A device for producing a clearance in a member, comprising a shaft adapted to be rotated, a circular saw rotatable with said shaft, an element including a gaging surface for and in spaced relation to said circular saw rotatable with said shaft, said gaging surface lying adjacent the periphery of said circular saw, and means for adjusting said circular saw and gaging surface away from and toward each other.

18. A device for producing a clearance in a member, comprising a shaft adapted to be rotated, a circular saw rotatable with said shaft, an element including a gaging surface for and in spaced relation to said circular saw rotatable with said shaft, said gaging surface lying adjacent the periphery of said circular saw, and means including interengaging threads for adjusting said circular saw and gaging surface relatively to each other.

19. A device for producing a clearance in a member, comprising a shaft adapted to be rotated, a circular saw upon and concentric with said shaft, said circular saw being rotatable with and lying in a plane perpendicular to said shaft, an element including a gaging surface for and in spaced relation to said circular saw rotatable with said shaft, said gaging surface lying in a plane perpendicular to said shaft and near the periphery of said circular saw, and means for adjusting said circular saw and gaging surface relatively to each other.

20. A device for producing a clearance in a member, comprising a shaft adapted to be rotated, a circular saw upon and concentric with said shaft, said circular saw being rotatable with and lying in a plane perpendicular to said shaft, an element including a gaging surface for and in spaced relation to said circular saw rotatable with said shaft, said gaging surface lying in a plane perpendicular to said shaft and near the periphery of said circular saw, and means including interengaging threads for adjusting said circular saw and gaging surface away from and toward each other axially of said shaft.

21. A device of the character described, comprising a shaft adapted to be rotated, a circular saw upon and concentric with said shaft, said circular saw being rotatable with and lying in a plane perpendicular to said shaft, a member adjacent said circular saw and rotatable with said shaft, said member including an outer, circumferential surface concentric with said shaft, an annular element including a gaging surface for and in spaced relation to said circular saw rotatable with said shaft, said gaging surface being situated in the neighborhood of the periphery of said circular saw and lying in a plane perpendicular to said shaft, and said annular element including an inner, circumferential surface concentric with said shaft and engaging said outer, circumferential surface of said member, and means for adjusting said circular saw and said gaging surface relatively to each other.

WALLACE F. LYNCH.
DANIEL E. MOELLER.